US011345478B2

United States Patent
Haynes et al.

(10) Patent No.: US 11,345,478 B2
(45) Date of Patent: May 31, 2022

(54) EVACUATION SLIDE AND METHOD OF FORMING EVACUATION SLIDE HAVING INTEGRAL CABLE CHANNEL

(71) Applicant: GOODRICH CORPORATION, Charlotte, NC (US)

(72) Inventors: Timothy C. Haynes, Prescott Valley, AZ (US); Ana Adilene Esparza, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 314 days.

(21) Appl. No.: 16/667,745

(22) Filed: Oct. 29, 2019

(65) Prior Publication Data

US 2021/0094693 A1 Apr. 1, 2021

Related U.S. Application Data

(63) Continuation-in-part of application No. 16/584,226, filed on Sep. 26, 2019, now abandoned.

(51) Int. Cl.
*B64D 25/14* (2006.01)
*A62B 1/20* (2006.01)

(52) U.S. Cl.
CPC ............... *B64D 25/14* (2013.01); *A62B 1/20* (2013.01); *Y10S 244/905* (2013.01)

(58) Field of Classification Search
CPC ........ B63C 2009/042; B63C 2009/035; B63C 2009/0035; B63C 2009/0041; B64D 25/14; A62B 1/20; Y10S 244/905
See application file for complete search history.

(56) References Cited

U.S. PATENT DOCUMENTS

| | | | | |
|---|---|---|---|---|
| 2,672,628 A | * | 3/1954 | Spanel | A47D 15/008 5/655 |
| 3,044,515 A | * | 7/1962 | Eades | B65D 88/1606 383/3 |
| 3,058,122 A | * | 10/1962 | McDaniel | A61G 7/0005 4/547 |
| 3,370,684 A | * | 2/1968 | Holcombe | A62B 1/20 193/25 B |
| 3,554,344 A | * | 1/1971 | Summer | B64D 25/14 193/25 B |
| 3,679,025 A | * | 7/1972 | Rummel | B64D 25/14 182/20 |
| 3,860,984 A | * | 1/1975 | Fisher | B64D 25/14 441/41 |
| 4,309,851 A | * | 1/1982 | Flagg | E04H 15/006 446/110 |

(Continued)

*Primary Examiner* — Hai Phan
*Assistant Examiner* — Son M Tang
(74) *Attorney, Agent, or Firm* — Snell & Wilmer LL.P.

(57) ABSTRACT

An inflatable tube for an inflatable slide may comprise an interior surface extending from a first longitudinal end of the inflatable tube to a second longitudinal end of the inflatable tube opposite the first longitudinal end. An exterior surface is opposite the interior surface and may include a land portion located proximate the first longitudinal end. A channel portion may extend from the second longitudinal end. The channel portion may include an attachment portion located proximate a distal longitudinal end of the channel portion. The interior surface of the attachment portion may be configured to attach to the land portion of the exterior surface.

15 Claims, 7 Drawing Sheets

(56) References Cited

U.S. PATENT DOCUMENTS

| | | | |
|---|---|---|---|
| 4,333,546 A | 6/1982 | Fisher | |
| 5,311,706 A * | 5/1994 | Sallee | E04C 3/005 |
| | | | 52/2.18 |
| 5,419,726 A * | 5/1995 | Switlik | B63B 35/58 |
| | | | 441/40 |
| 5,906,340 A | 5/1999 | Duggal | |
| 6,044,881 A * | 4/2000 | Welch | B60J 11/00 |
| | | | 150/166 |
| 6,066,016 A * | 5/2000 | Yonover | B63C 9/04 |
| | | | 235/379 |
| 6,443,259 B1 | 9/2002 | Oney et al. | |
| 6,877,696 B2 * | 4/2005 | Moro | B64D 25/14 |
| | | | 244/137.2 |
| 6,966,414 B2 * | 11/2005 | Zonneveld | A62B 3/00 |
| | | | 193/25 A |
| 9,309,002 B2 | 4/2016 | Fellmann et al. | |
| 10,118,708 B2 * | 11/2018 | Hartman | B64D 25/14 |
| 10,427,805 B2 * | 10/2019 | Cecchini | B64G 1/407 |
| 2002/0117354 A1 * | 8/2002 | Baker | B64D 25/14 |
| | | | 182/48 |
| 2004/0118979 A1 * | 6/2004 | Moro | B64D 25/14 |
| | | | 244/137.2 |
| 2010/0038076 A1 * | 2/2010 | Spray | E21B 43/103 |
| | | | 166/207 |
| 2012/0009832 A1 * | 1/2012 | Rawlings-Lloyd | B63B 45/04 |
| | | | 441/36 |
| 2017/0266875 A1 * | 9/2017 | Brensinger | B29C 65/08 |
| 2018/0362167 A1 * | 12/2018 | Schomer | B64D 15/166 |
| 2019/0077515 A1 * | 3/2019 | Volny | B64D 25/14 |
| 2019/0224922 A1 * | 7/2019 | Brensinger | B29C 66/8432 |

\* cited by examiner

EVACUATION SLIDE AND METHOD OF FORMING EVACUATION SLIDE HAVING INTEGRAL CABLE CHANNEL

CROSS REFERENCE TO RELATED APPLICATIONS

This application is a continuation-in-part of U.S. patent application Ser. No. 16/584,226, filed on Sep. 26, 2019 and entitled "EVACUATION SLIDE AND METHOD OF FORMING EVACUATION SLIDE HAVING INTEGRAL CABLE CHANNEL." The '226 application is incorporated by reference herein in its entirety.

FIELD

The present disclosure relates to aircraft evacuation systems and, in particular, to evacuation slides having cable channels and methods of forming evacuation slides having cable channels.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. In the event of a water landing, the inflatable evacuation slide may be employed as a life raft. Evacuation systems may also deploy from the side of an aircraft fuselage, for example, or from over a wing of the aircraft, i.e., "off-wing."

Off-wing evacuation systems may include a readiness sign, which indicates to evacuees whether the slide is fully deployed and/or in a position to safely covey evacuees to an exit surface. A cable may be operably coupled to the readiness sign and routed through one or more discrete readiness indicator tunnels attached (e.g., sewn) to the longitudinal tubes of the evacuation slide.

SUMMARY

An inflatable tube for an inflatable slide is disclosed herein. In accordance with various embodiments, the inflatable tube may comprise an interior surface and an exterior surface opposite the interior surface. The interior surface may extend from a first longitudinal end of the inflatable tube to a second longitudinal end of the inflatable tube opposite the first longitudinal end. The exterior surface may include a land portion located proximate the first longitudinal end of the inflatable tube. A channel portion may extend from the second longitudinal end. The channel portion may include an attachment portion located proximate a distal longitudinal end of the channel portion. The interior surface of the attachment portion may be configured to attach to the land portion of the exterior surface.

In various embodiments, a seam tape may be bonded to the interior surface at the first longitudinal end. In various embodiments, the seam tape may be bonded to the interior surface at the second longitudinal end.

In various embodiments, an adhesive may bond the attachment portion to the land portion. In various embodiments, the channel portion may define a cable channel. In various embodiments, the cable channel may extend from the second longitudinal end to the adhesive bonding the attachment portion to the land portion.

In various embodiments, a circumferential length of the channel portion extending from the second longitudinal end to the distal longitudinal end of the channel portion may be between 2 inches and 4 inches.

An inflatable slide is also disclosed herein. In accordance with various embodiments, the inflatable slide may comprise a first inflatable tube and a second inflatable tube. The first inflatable tube may include a first integral cable channel extending from at least one of a head end or a toe end of the first inflatable tube. The second inflatable tube may be coupled to the at least one of the head end or the toe end of the first inflatable tube. An attachment portion of the first integral cable channel may be coupled to the second inflatable tube.

In various embodiments, the first inflatable tube may include an interior surface extending from a first longitudinal end of the first inflatable tube to a second longitudinal end of the first inflatable tube opposite the first longitudinal end of the first inflatable tube, and a first channel portion extending from the least one of the head end or the toe end, the first channel portion including the attachment portion. The interior surface of the attachment portion may be configured to attach to a land portion on an exterior surface of the second inflatable tube.

In various embodiments, a third inflatable tube may include a second integral cable channel extending from at least one of a head end or a toe end of the third inflatable tube. A fourth inflatable tube may be coupled to the at least one of the head end or the toe end of the third inflatable tube. A second attachment portion of the second integral cable channel may be coupled to the fourth inflatable tube.

In various embodiments, the second integral cable channel may include a pouch extending away from the fourth inflatable tube and the third inflatable tube. In various embodiments, a light may be coupled to at least one of the first inflatable tube of the second inflatable tube. A water-activated battery may be located in the pouch. A cable may electrically connect the light and the water-activated battery.

In various embodiments, the cable may be located in an upper cable channel defined by the first integral cable channel and a lower cable channel defined by the second integral cable channel.

In various embodiments, the third inflatable tube may include an interior surface extending from a first longitudinal end of the third inflatable tube to a second longitudinal end of the third inflatable tube opposite the first longitudinal end of the third inflatable tube, and a second channel portion extending from the least one of the head end or the toe end. The second channel portion may include the attachment portion. The interior surface of the attachment portion may be configured to attach to a land portion on an exterior surface of the fourth inflatable tube.

A method of assembly an inflatable tube is also disclosed herein. In accordance with various embodiments, the method may comprise attaching a seam tape to an internal surface of the inflatable tube at a first longitudinal end, attaching the seam tape to the internal surface of the inflatable tube at a second longitudinal end, and coupling an attachment portion of a cable channel portion to an exterior surface of the inflatable tube proximate the first longitudinal end. The cable channel portion may extend from the second longitudinal end and may define a cable channel.

In various embodiments, the method may further comprise locating a cable through the cable channel. In various embodiments, the method may further comprise attaching the cable to a readiness indicator sign. In various embodiments, the method may further comprise detachably coupling the readiness indicator sign to a ramp portion of an inflatable slide.

In various embodiments, the method may further comprise bonding the attachment portion to a land portion of the exterior surface using an adhesive. In various embodiments, a longitudinal length of the cable channel portion is less than a longitudinal length of the inflatable tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option.

Throughout the present disclosure, like reference numbers denote like elements. Accordingly, elements with like element numbering may be shown in the figures, but may not be necessarily repeated herein for the sake of clarity. As used herein, "proximate" refers to a direction inward, or generally, towards the reference component.

Figure 1A:
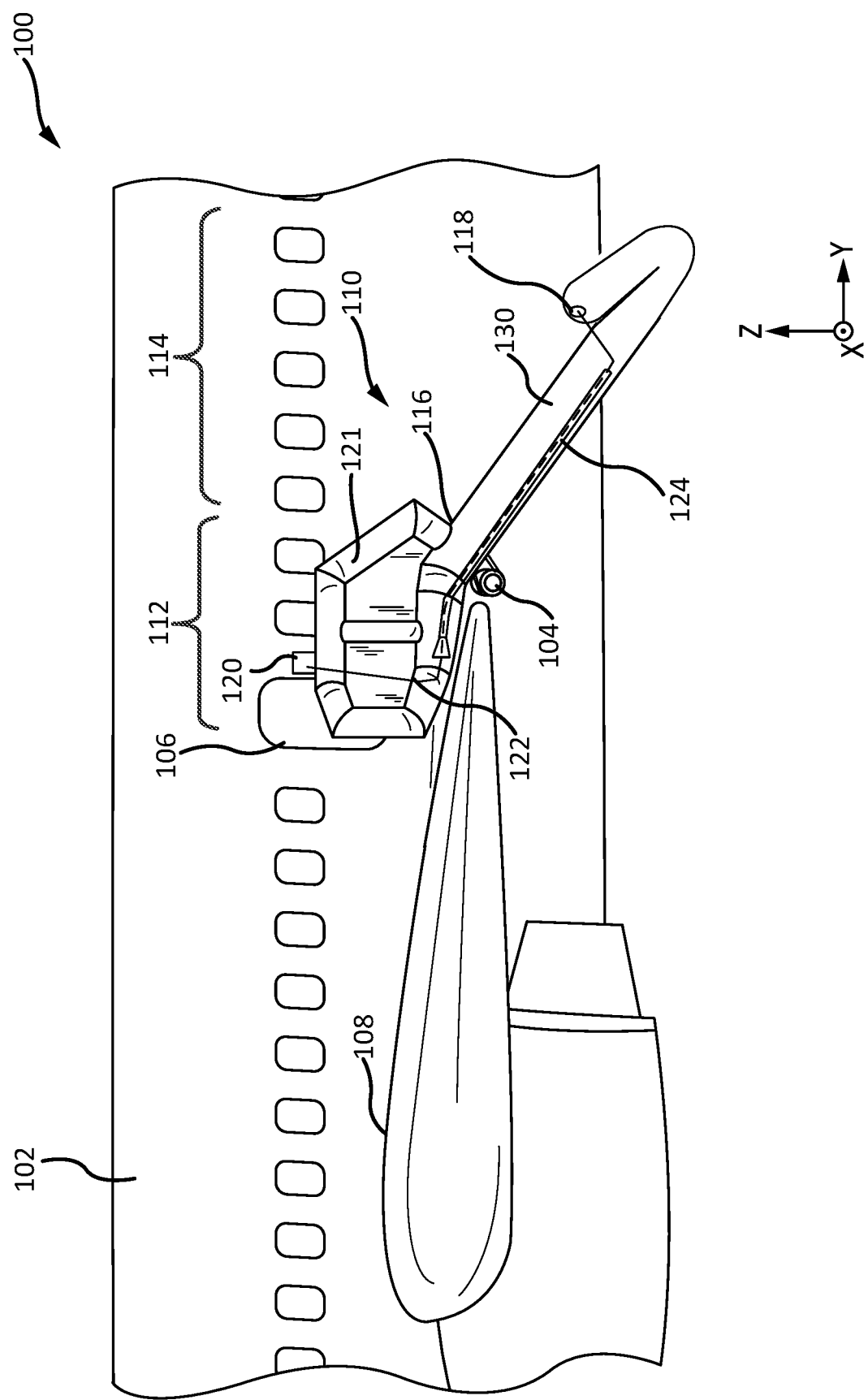
FIG. 1A illustrates an off-wing evacuation system in a partially deployed state, in accordance with various embodiments.

With reference to FIG. 1A, an off-wing evacuation system 100 in a partially deployed state is illustrated. In accordance with various embodiments, off-wing evacuation system 100 may deploy from an aircraft 102. Off-wing evacuation system 100 may include an inflatable slide 110. According to various embodiments, inflatable slide 110 may be used for emergency evacuation of aircraft 102 and may be configured to pack within a compartment of the aircraft 102 (e.g., in an aircraft door, a slide bustle, etc.). Inflatable slide 110 may be positioned near an exit door 106 of aircraft 102. In various embodiments, exit door 106 may be located over a wing 108 of aircraft 102. In the event of an emergency, exit door 106 may be opened by a passenger or crew member of aircraft 102. Inflatable slide 110 may deploy in response to the passenger or crew member opening exit door 106. In various embodiments, inflatable slide 110 may deploy in response to another action taken by the passenger or crew member such as, for example, depression of a button or actuation of a lever.

Off-wing evacuation system 100 may include an inflation source 104 coupled to inflatable slide 110 and configured to inflate the inflatable slide 110. Inflation source 104 may include one or more compressed fluid sources, which may include a compressed gas tank, an inflation cylinder, pyrotechnic apparatus, or other suitable inflation device. Upon deployment, inflation source 104 may deliver a pressurized fluid (such as in a gaseous state) to fill inflatable slide 110 with the pressurized fluid. In response to receiving the pressurized fluid, inflatable slide 110 may begin to inflate.

Inflatable slide 110 may extend from exit door 106, and may comprise a ramp portion 112 and a slide portion 114. Ramp portion 112 may be secured to aircraft 102, such as by a girt. Ramp portion 112 may extend across a portion of wing 108 to allow evacuees to walk or traverse across wing 108 to access slide portion 114 of inflatable slide 110. In this regard, evacuees may exit aircraft 102 onto wing 108, enter and walk across ramp portion 112, and then slide down the slide portion 114 to an exit surface. Ramp portion 112 may be generally horizontal, i.e., a walking surface may be generally in the x-z plane, and may also be slightly angled with respect to the x-z plane and conform to the surface geometry of wing 108.

In various embodiments, slide portion 114 may extend from ramp portion 112 and generally slope downward (in the negative z-direction) toward an exit surface. Slide portion 114 may comprise a head end 116 and toe end 118. Head end 116 of slide portion 114 may be coupled to or integral with ramp portion 112. In FIG. 1A, toe end 118 is partially deployed (i.e., not fully deployed). In various embodiments, inflatable slide 110 may be folded when stowed. Upon deployment of inflatable slide 110, inflation source 104 may deliver pressurized fluid to inflatable slide 110, thereby causing inflatable slide 110 to unfold. It may be unsafe for evacuees to enter slide portion 114 prior to slide portion 114 fully deploying. Accordingly, a readiness indicator sign 120 is detachably coupled to ramp portion 112 of inflatable slide 110. For example, readiness indicator sign 120 is detachably coupled to ramp portion 112 via hook and loop fasteners, speed lacing, snaps, a thread connection, or any other detachable fastener system. In various embodiments, readiness indicator sign 120 is detachably coupled to a hand rail 121 of ramp portion 112. Readiness indicator sign 120 is configured to inform evacuees that slide portion 114 is not fully deployed. For example, readiness indicator sign 120 may comprise a stop sign or other sign having a "do not go" message. In various embodiments, readiness indicator sign 120 may include a releasable strap extending laterally across ramp portion 112.

Figure 1B:
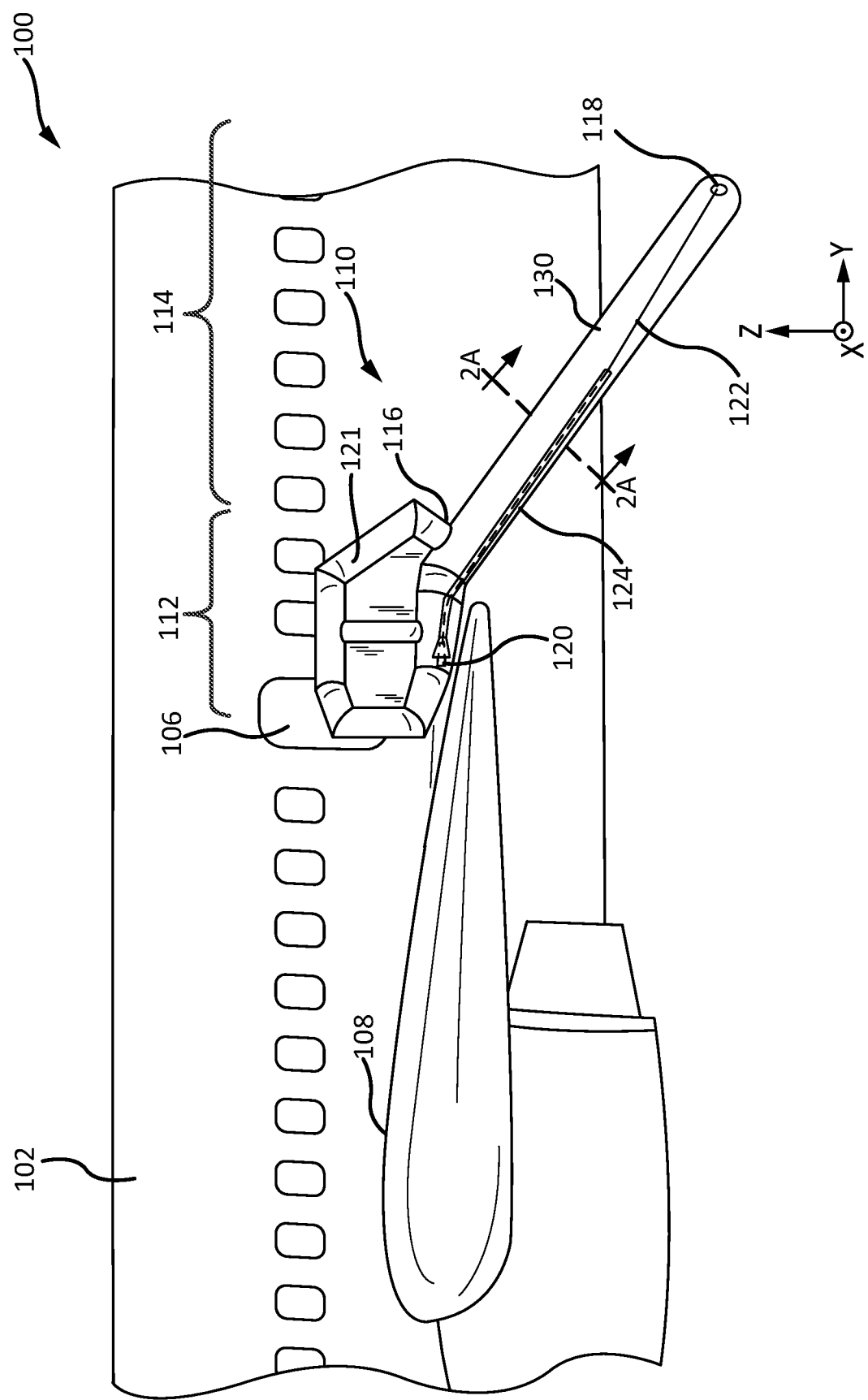
FIG. 1B illustrates an off-wing evacuation system in a fully deployed state, in accordance with various embodiments.

Readiness indicator sign 120 is operably coupled to toe end 118 via a cable 122. Cable 122 may detach readiness indicator sign 120 from ramp portion 112, in response to toe end 118 translating to the fully deployed position (FIG. 1B). Cable 122 may be coupled to readiness indicator sign 120 and toe end 118 of slide portion 114.

FIG. 1B illustrates slide portion 114 in the fully deployed position. In the fully deployed position, toe end 118 may contact the exit surface. The exit surface may be, for example water, a runway, uneven terrain or other any other surface. Inflatable slide 110 may be removably coupled to the fuselage of aircraft 102. Inflatable slide 110 may be decoupled from aircraft 102 in response to being fully inflated or being manually detached in order to allow passengers and/or crew members to safely float away from the aircraft 102.

In fully deployed position, readiness indicator sign 120 is decoupled from ramp portion 112. Toe end 118 translating to the fully deployed position may pull or otherwise translate cable 122 and readiness indicator sign 120 away from ramp portion 112. In this regard, in the fully deployed position, readiness indicator sign 120 may be located out of view of evacuees at exit door 106. Translating (e.g., decoupling) readiness indicator sign 120 away from ramp portion 112 allows evacuees to determine by looking from within the fuselage whether the slide portion 114 is inflated and extended so that evacuees may safely enter slide portion 114. In this regard, readiness indicator sign 120 is configured to allow evacuees to look out exit door 106 of aircraft 102 and by observing the position of readiness indicator sign 120 determine if the slide portion 114, which is generally not visible from exit door 106, is in condition (e.g., sufficiently inflated) for evacuating passengers.

In accordance with various embodiments, inflatable slide 110 includes an integral cable channel 124. Integral cable channel 124 may be formed along one or more inflatable tubes 130 of inflatable slide 110. Inflatable tubes 130 may extend from head end 116 to toe end 118 of slide portion 114. In various embodiments, inflatable tubes 130 may extend from a proximal end of ramp portion 112 to a distal end of ramp portion. The proximal end of ramp portion 112 may located proximate an entry of ramp portion 112. The distal end of ramp portion 112 may be located proximate and/or attached to head end 116 of slide portion 114. In this regard, inflatable tubes 130 may define a sliding surface of slide portion 114 and walkway of ramp portion 112. In various embodiment, inflatable tube(s) 130 may form one continuous gas fillable chamber.

Cable 122 may be located within a cable channel 132 (FIG. 2A) defined by integral cable channel 124. Locating cable with cable channel 132 tends to prevent entanglement and increases a likelihood that readiness indicator sign 120 functions properly.

Figure 2A:
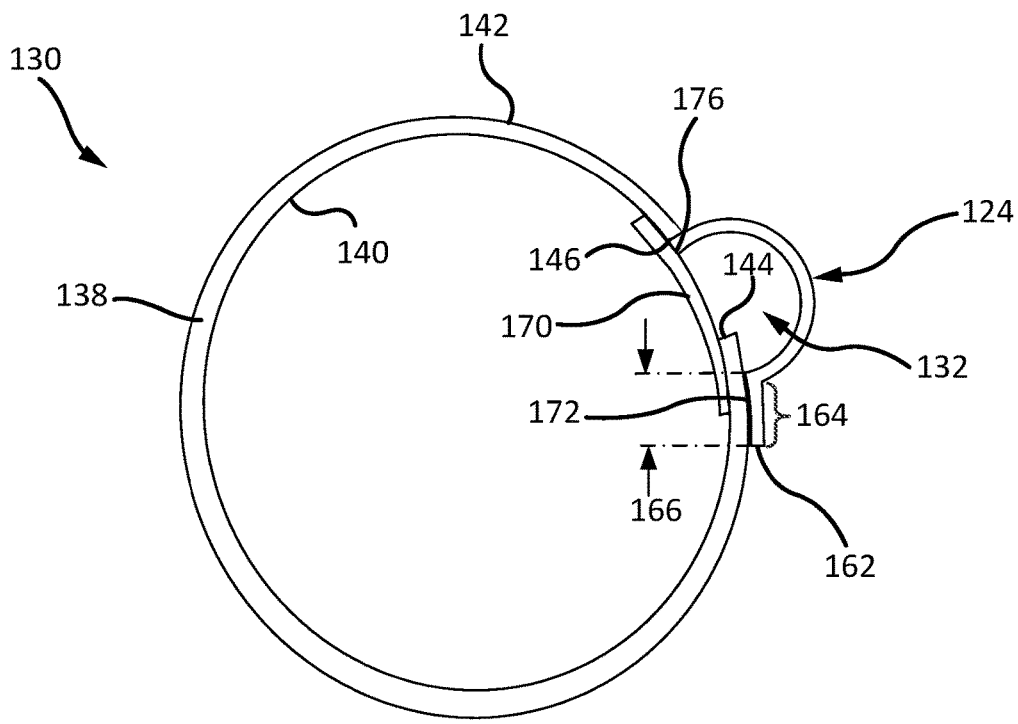
FIG. 2A illustrates a cross-section view of an inflatable tube having an integral cable channel, in accordance with various embodiments.
Figure 2B:
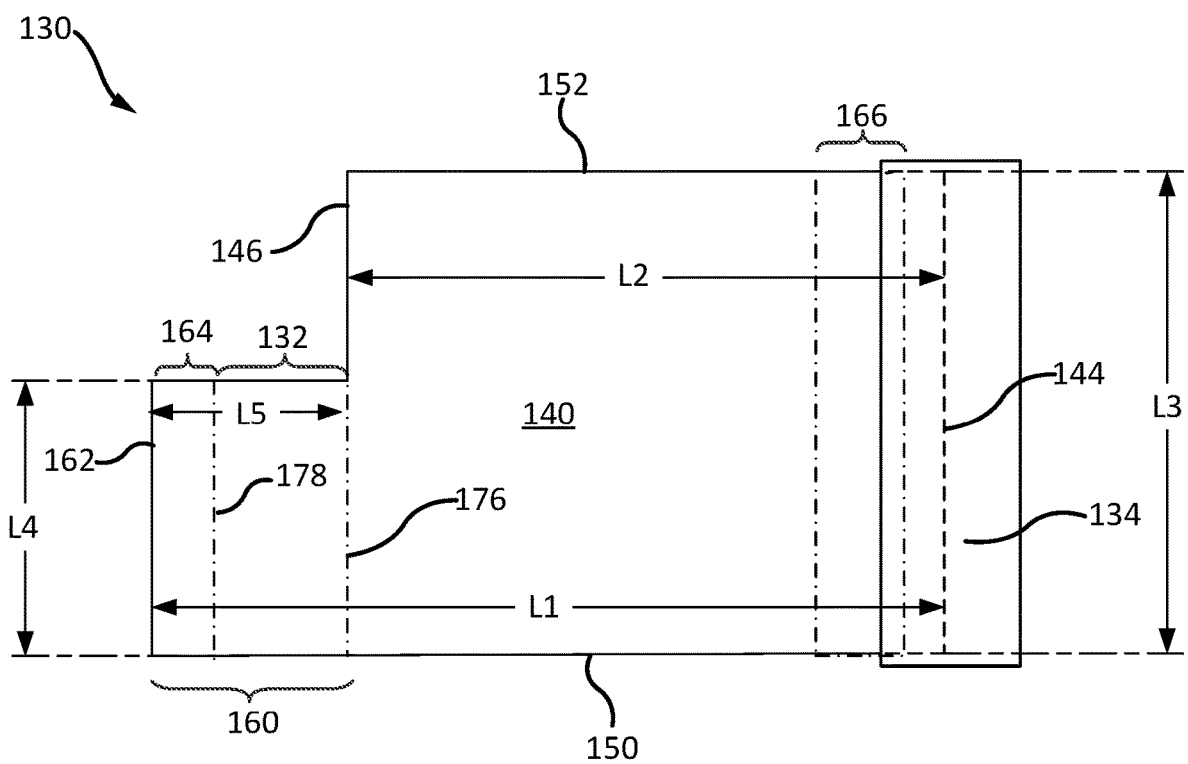
FIG. 2B illustrates a panel configured to form an inflatable tube having an integral cable channel, in accordance with various embodiments.

FIG. 2A shows a cross-section view, taken along the line 2A-2A in FIG. 1B, of an inflatable tube 130 of inflatable slide 110. In FIG. 2A, cable 122 is removed for clarity. FIG. 2B illustrates inflatable tube 130 prior to assembly (i.e., FIG. 2B illustrates the fabric panel from which inflatable tube 130 is formed). Inflatable tube 130 may be comprised of a flexible fabric, which may comprise a base cloth with coating, such as nylon or ballistic nylon coated in polyurethane, neoprene, and/or aluminum, or other suitable coating.

With combined reference to FIGS. 2A and 2B, in accordance with various embodiments, inflatable tube 130 includes an interior (or radially inward facing) surface 140 and an exterior (or radially outward facing) surface 142. Interior and exterior surfaces 140, 142 extend from a head end 150 of inflatable tube 130 to a toe end 152 of inflatable tube 130 and from a first longitudinal end 144 of inflatable tube 130 to a second longitudinal end 146 of inflatable tube 130. Toe end 152 of inflatable tube 130 is located closer to toe end 118 of inflatable slide 110 as compared to head end 150.

A seam tape 170 is bonded to interior surface 140 at first longitudinal end 144. Seam tape 170 is further bonded to interior surface 140 at second longitudinal end 146. In various embodiments, seam tape 170 may be adhesively bonded to interior surface 140 at first and second longitudinal ends 144, 146. Seam tape 170 is configured to form an airtight seal with interior surface 140.

In accordance with various embodiments, inflatable tube 130 includes a cable channel portion 160. Cable channel portion 160 extends from second longitudinal end 146. Cable channel portion 160 is configured to form integral cable channel 124. In various embodiments, a circumferential length L1 of interior surface 140, as measured between first longitudinal end 144 and a distal longitudinal end 162 of cable channel portion 160, is greater than a circumferential length L2 of interior surface 140, as measured between first longitudinal end 144 and second longitudinal end 162. In various embodiments, a longitudinal length L3 of interior surface 140, as measured between head end 150 and toe end 152, is greater than a longitudinal length L4 of interior surface 140 at cable channel portion 160. In this regard, the longitudinal length L4 of cable channel portion 160 may be less than the longitudinal length L3 of inflatable tube 130. In various embodiments, the longitudinal length L4 of cable channel portion 160 may be equal to the longitudinal length L3 of inflatable tube 130.

Cable channel portion 160 includes an attachment portion 164 located proximate distal longitudinal end 162 of cable channel portion 160. Attachment portion 164 may extend the entire longitudinal length L4 of cable channel portion 160. Stated differently, the longitudinal length of attachment portion 164 is equal to longitudinal length L4 of cable channel portion 160. Interior surface 140 of attachment portion 164 is configured to attach to a land portion 166 on exterior surface 142. Land portion 166 is located proximate to first longitudinal end 144.

In various embodiments, an adhesive 172 may bond attachment portion 164 to land portion 166. Cable channel portion 160 defines cable channel 132. The circumferential length of attachment portion 164 is less than a circumferential length L5 of cable channel portion 160, thereby creating cable channel 132. Cable channel 132 comprises an area of cable channel portion 160 that is not affixed to exterior surface 142, seam table 170, or adhesive 172. Cable channel 132 extends from a seal tape attachment point 176 along second longitudinal end 146 to an adhesive attachment point 178 along attachment portion 164. Seal tape 170 is affixed along seal tape attachment point 176. Adhesive 172 is affixed along adhesive attachment point 178. In various embodiments, circumferential length L5 of cable channel portion 160 may be between 1.0 inches and 6.0 inches (2.5 cm and 15.2 cm). Circumferential length L5 is measured between distal longitudinal end 162 and second longitudinal end 146 (i.e., between distal longitudinal end 162 and seal tape attachment point 176). In various embodiments, circumferential length L5 may be between 2.0 inches and 4.0 inches (5.1 cm and 10.2 cm). In various embodiments, circumferential length L5 may be between 2.75 inches and 3.25 inches (6.99 cm and 8.26 cm).

In accordance with various embodiments, cable channel portion 160 is integral to inflatable tube 130. In this regard, inflatable tube 130 including cable channel portion 160 may be formed from a single panel or single piece of fabric. Integrating the cable channel by utilizing the fabric of inflatable tube 130 tends to reduce cost and time associated with manufacturing inflatable slide 110.

Figure 3A:
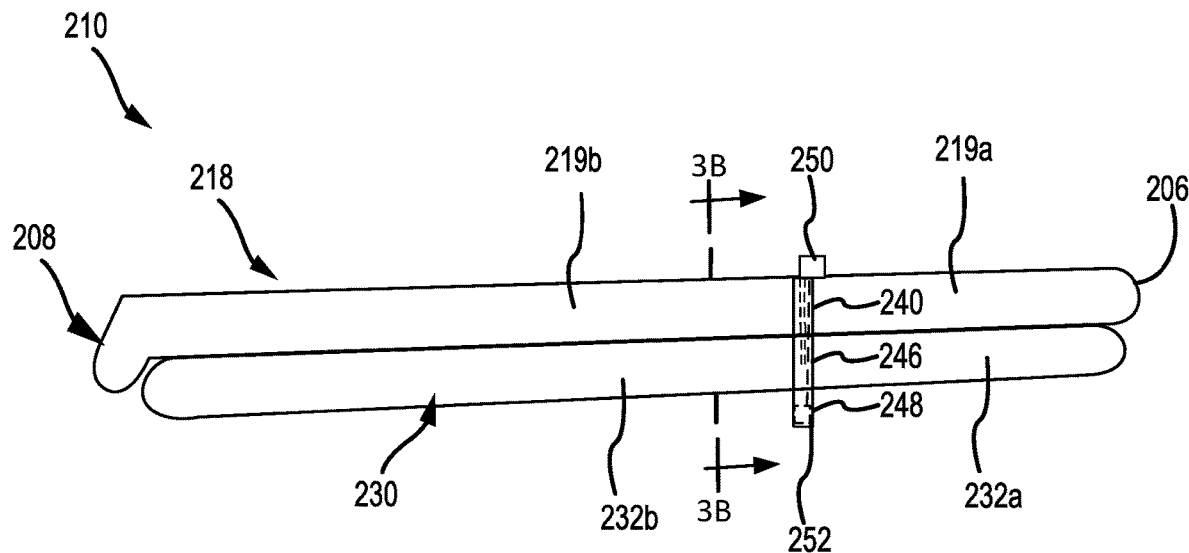
FIG. 3A illustrates a side view of an inflatable slide having a vertically extending integral cable channel and a battery pouch, in accordance with various embodiments.
Figure 3B:
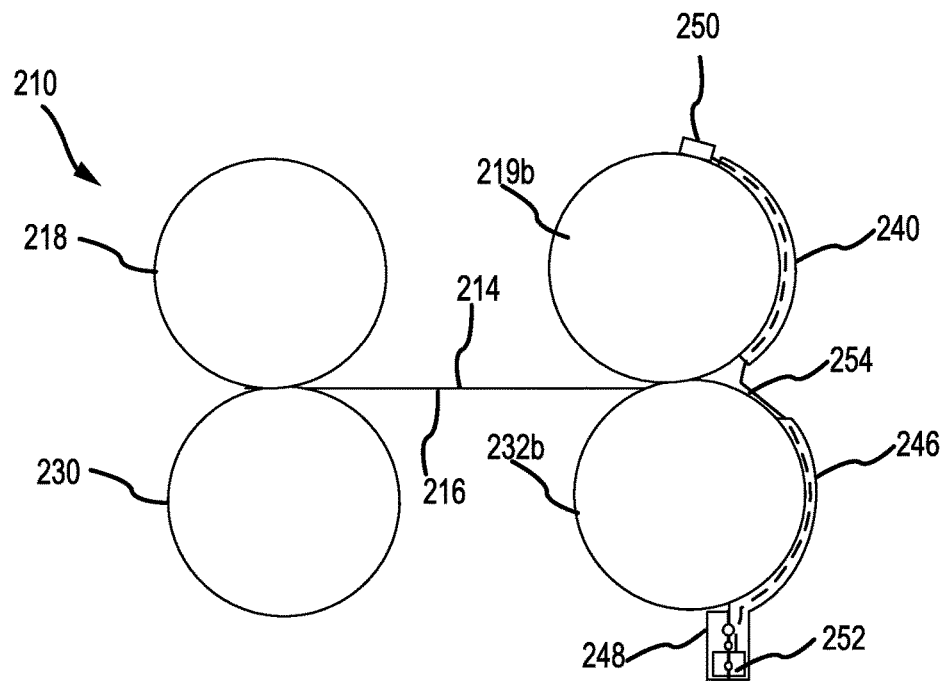
FIG. 3B illustrates a cross-section view of an inflatable slide having vertically extending integral cable channel and a battery pouch, in accordance with various embodiments.

With reference to FIGS. 3A and 3B, an inflatable evacuation slide 210 is illustrated in the deployed position. Inflatable slide 210 may be deployed from an aircraft, such as aircraft 102 in FIG. 1A. Inflatable slide 210 includes a head end 206 and a toe end 208 opposite head end 206. Head end 206 may be coupled to an aircraft structure (e.g., a door sill) via a girt. Upon deployment of inflatable slide 210, toe end 208 translates away from the aircraft and contacts an exit surface (e.g., the ground or water in the case of a water landing). Inflatable slide 210 includes sliding surface 214 and an underside surface 216 opposite sliding surface 214. Sliding surface 214 extends from head end 206 to toe end 208 of inflatable slide 210. During an evacuation event, underside surface 216 is oriented generally towards an exit surface and sliding surface 214 is oriented generally away from the exit surface. Inflatable slide 210 includes a first (or upper) rail 218. First rail 218 may extend generally around a perimeter of sliding surface 214 of inflatable slide 210. First rail 218 may include one or more fluidly coupled inflatable tubes, such as first inflatable tube 219a and second inflatable tube 219b.

Figure 4A:
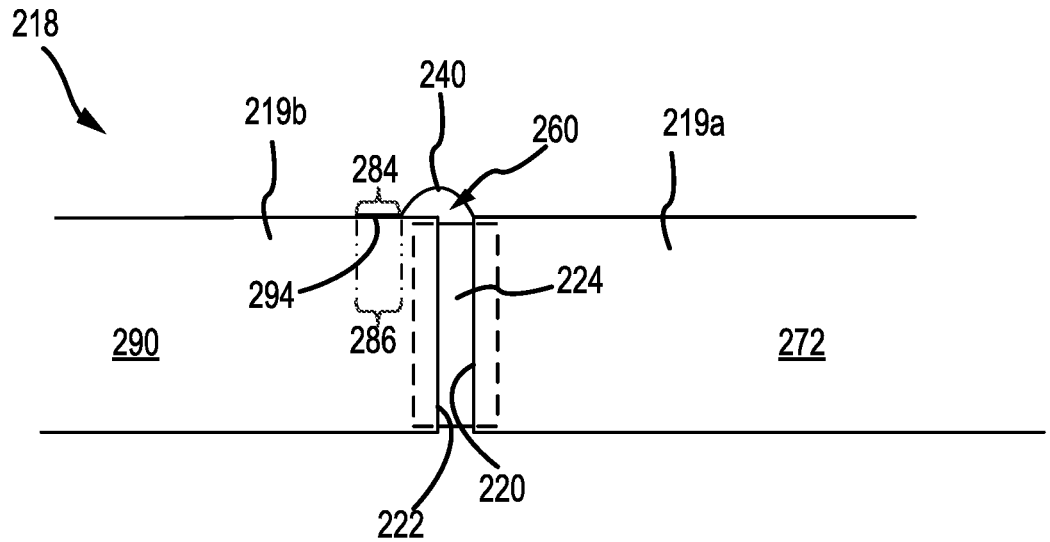
FIGS. 4A and 4B illustrate a vertically extending integral cable channel formed at an inflatable tube attachment location, in accordance with various embodiments.

With reference to FIG. 4A, a toe end 220 of first inflatable tube 219a may be attached to a head end 222 of second inflatable tube 219b. A seam tape 224 may be adhesively coupled between toe end 220 of first inflatable tube 219a and head end 222 of second inflatable tube 219b. Seam tape 224 may form an airtight seal with first inflatable tube 219a and second inflatable tube 219b. As discussed in further detail below, first inflatable tube 219a includes an integral cable channel 240 extending from toe end 220 of first inflatable tube 219a and coupled to head end 222 of second inflatable tube 219b. While FIG. 4A illustrates integral cable channel 240 extending from toe end 220 of first inflatable tube 219a and coupled to head end 222 of second inflatable tube 219b, it is further contemplated and understood that integral cable channel 240 may extend from head end 222 of second inflatable tube 219b and be coupled to toe end 220 of the first inflatable tube 219a.

Returning to FIGS. 3A and 3B, integral cable channel 240 may extend vertically. In this regard, integral cable channel 240 may extend in a direction generally perpendicular to sliding surface 214. In various embodiments, integral cable channel 240 may extend between 30° and 180° about a circumference of first rail 218. In various embodiments, integral cable channel 240 may extend between 60° and 90° about a circumference of first rail 218.

In various embodiments, inflatable slide 210 may further include a second (or lower) rail 230. During an evacuation event, second rail 230 may be located generally proximate (i.e., closer to) the exit surface as compared to first rail 218. Stated differently, when inflatable slide 210 is in a deployed position, second rail 230 may be located generally under first rail 218. In various embodiments, first and second rails 218, 230 may be in fluid communication. For example, in various embodiments, first rail 218 and second rail 230 may be part of one, interconnected chamber that fills with gas in response to deployment of inflatable slide 210.

Figure 4B:
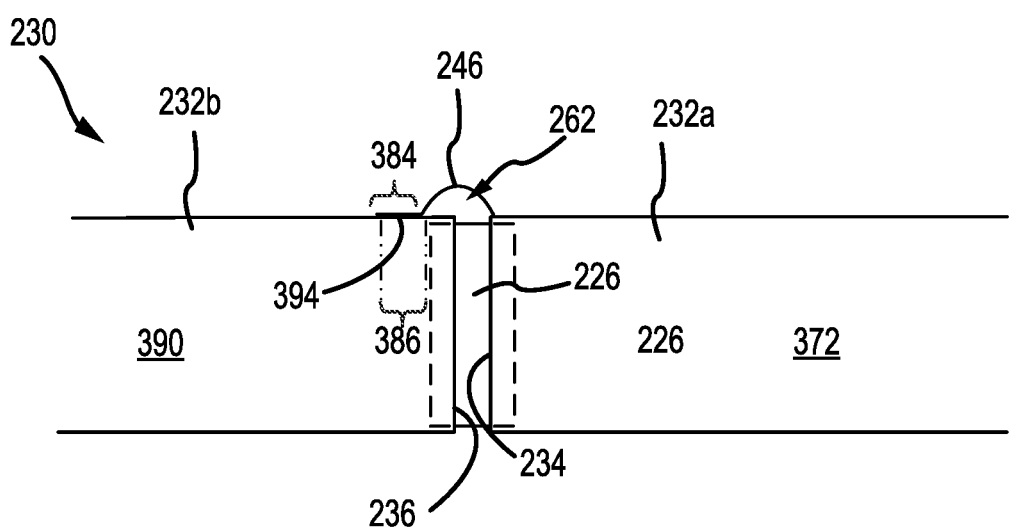

Second rail 230 may include one or more inflatable tubes, such as third inflatable tube 232a and fourth inflatable tube 232b. With reference to FIG. 4B, a toe end 234 of third inflatable tube 232a may be attached to a head end 236 of fourth inflatable tube 232b. A seam tape 226 may be adhesively coupled between toe end 234 of third inflatable tube 232a and head end 236 of fourth inflatable tube 232b. Seam tape 226 may form an airtight seal with third inflatable tube 232a and fourth inflatable tube 232b. As discussed in further detail below, third inflatable tube 232a includes an integral cable channel 246 extending from toe end 234 of third inflatable tube 232a and coupled to head end 236 of fourth inflatable tube 232b. While FIG. 4B illustrates integral cable channel 246 extending from toe end 234 of third inflatable tube 232a and coupled to head end 236 of fourth inflatable tube 232b, it is further contemplate and understood that integral cable channel 246 may extend from head end 236 of fourth inflatable tube 232b and be coupled to toe end 234 of the third inflatable tube 232a.

Returning to FIGS. 3A and 3B, integral cable channel 246 may extend vertically. In this regard, integral cable channel 246 may extend in a direction generally perpendicular to sliding surface 214 (FIG. 3B)., in various embodiments, integral cable channel 240 may extend between 30° and 180° about a circumference of second rail 230. In various embodiments, integral cable channel 240 may extend between 60° and 90° about a circumference of second rail 230. In various embodiments, integral cable channel 246 may include a battery pouch 248. Battery pouch 248 may extend in a vertical direction, generally away from second rail 230 and first rail 218. In the event of a water landing, battery pouch 248 is configured to be located within the water.

In the event of a water landing, inflatable slide 210 may be used as a life raft. Inflatable slide may in include a light 250 located along first rail 218 or second rail 230. A water-activated battery 252 may be operatively coupled to light 250. Water-activated battery 252 may be configured to provide power for light 250, in response to water-activated battery being submersed or otherwise in contact with water. An electrical cable 254 may be electrically coupled to light 250 and water-activated battery 252. Electrical cable 254 may be located through an upper (or first) cable channel 260 (FIG. 4A) defined by integral cable channel 240 of first rail 218 and a lower (or second) cable channel 262 (FIG. 4B) defined by integral cable channel 246 of second rail 230. In various embodiments, water-activated battery 252 may be located in battery pouch 248 of integral cable channel 246.

Figure 5A:
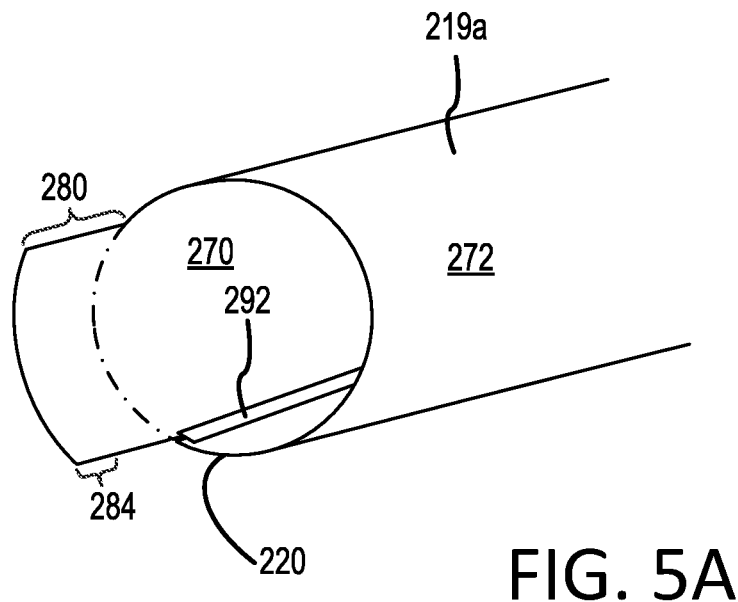
FIG. 5A illustrates an inflatable tube having a cable channel portion extending from toe end of the inflatable tube, in accordance with various embodiments.
Figure 5B:
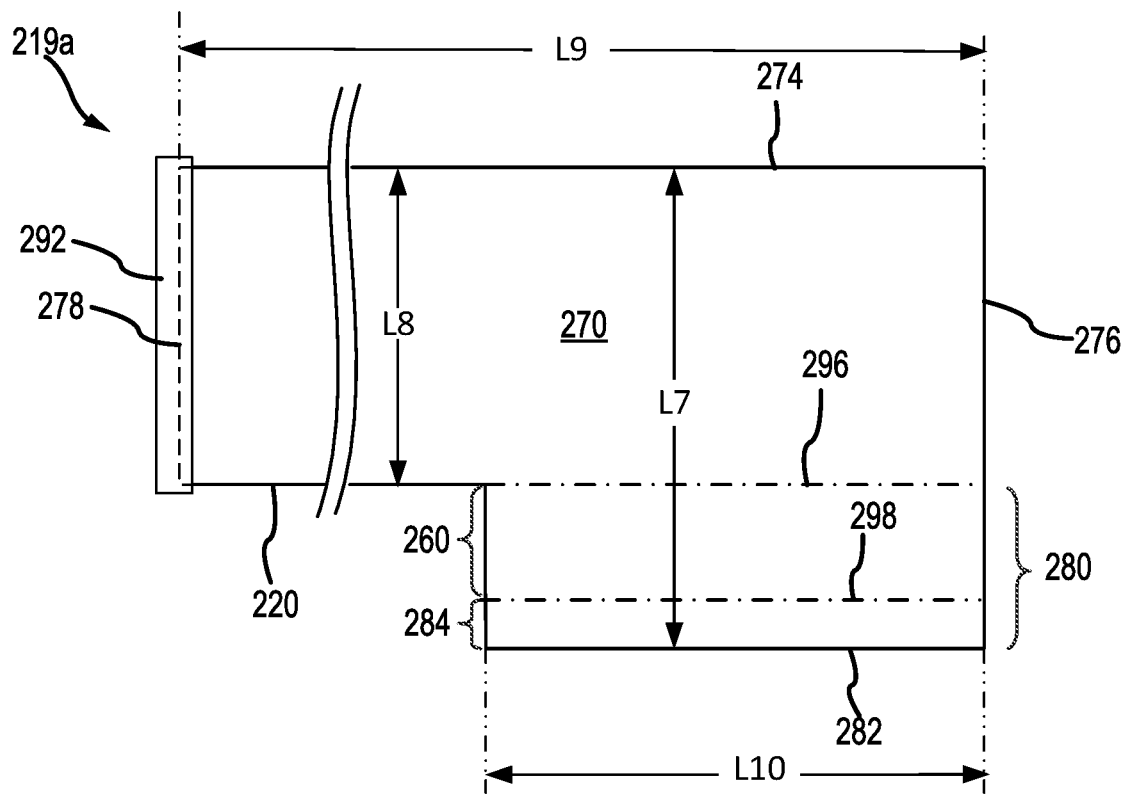
FIG. 5B illustrates a panel configured to form the inflatable tube of FIG. 5A, in accordance with various embodiments.

FIG. 5A shows toe end 220 of first inflatable tube 219a prior to attachment to second inflatable tube 219b. FIG. 5B illustrates first inflatable tube 219a prior to assembly of first inflatable tube 219a (i.e., FIG. 5B illustrates the fabric panel from which first inflatable tube 219a is formed).

With combined reference to FIGS. 5A and 5B, in accordance with various embodiments, first inflatable tube 219a includes an interior (or radially inward facing) surface 270 and an exterior (or radially outward facing) surface 272. Interior and exterior surfaces 270, 272 extend from toe end 220 of first inflatable tube 219a to a head end 274 of first inflatable tube 219a and from a first longitudinal end 276 of first inflatable tube 219a to a second longitudinal end 278 of first inflatable tube 219a. A seam tape 292 bonds first longitudinal end 276 to second longitudinal end 278. Seam tape 292 is configured to form an airtight seal with interior surface 270.

In accordance with various embodiments, first inflatable tube 219a includes a cable channel portion 280. Cable channel portion 280 extends from toe end 220. Cable channel portion 280 is configured to form integral cable channel 240 in FIG. 4A. In various embodiments, a longitudinal length L7 of interior surface 270, as measured between head end 274 and a distal end 282 of cable channel portion 280, is greater than a longitudinal length L8 of interior surface 270, as measured between head end 274 and toe end 220. In various embodiments, a circumferential length L9 of interior surface 140, as measured between first longitudinal end 276 and second longitudinal end 278, is greater than a circumferential length L10 of interior surface 270 at cable channel portion 280. In this regard, the circumferential length L10 of cable channel portion 280 may be less than the circumference L9 of first inflatable tube 219a.

With combined reference to FIG. 4A, FIG. 5A, and FIG. 5B, cable channel portion 280 includes an attachment portion 284 located proximate distal end 282 of cable channel portion 280. Interior surface 270 of attachment portion 284 is configured to attach to a land portion 286 on an exterior surface 290 of second inflatable tube 219b. Land portion 286 is located proximate to head end 222 of second inflatable tube 219b. In various embodiments, an adhesive 294 may bond attachment portion 284 to land portion 286.

In various embodiments, cable channel portion 280 defines cable channel 260. The longitudinal length of attachment portion 284 is less than the longitudinal length of cable channel portion 280, thereby creating cable channel 260. Cable channel 260 comprises an area of cable channel portion 280 that is not affixed to exterior surface 290 of second inflatable tube 219b or seam tape 224. Cable channel 260 extends from a seal tape attachment point 296 located along toe end 220 to an adhesive attachment point 298 formed along attachment portion 284. Seal tape 224 is affixed along seal tape attachment point 296. Adhesive 294 is affixed along adhesive attachment point 298.

In accordance with various embodiments, cable channel portion 280 is integral to first inflatable tube 219a. In this regard, first inflatable tube 219a including cable channel portion 280 may be formed from a single panel or single piece of fabric. Integrating the cable channel by utilizing the fabric of first inflatable tube 219a tends to reduce the cost and time associated with manufacturing inflatable slide 210.

Figure 6A:
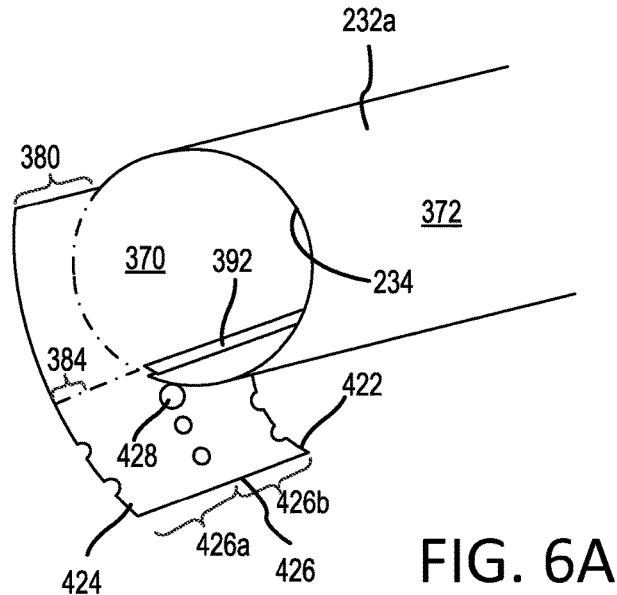
FIG. 6A illustrates an inflatable tube having a cable channel portion and pouch portion extending from toe end of the inflatable tube, in accordance with various embodiments.
Figure 6B:
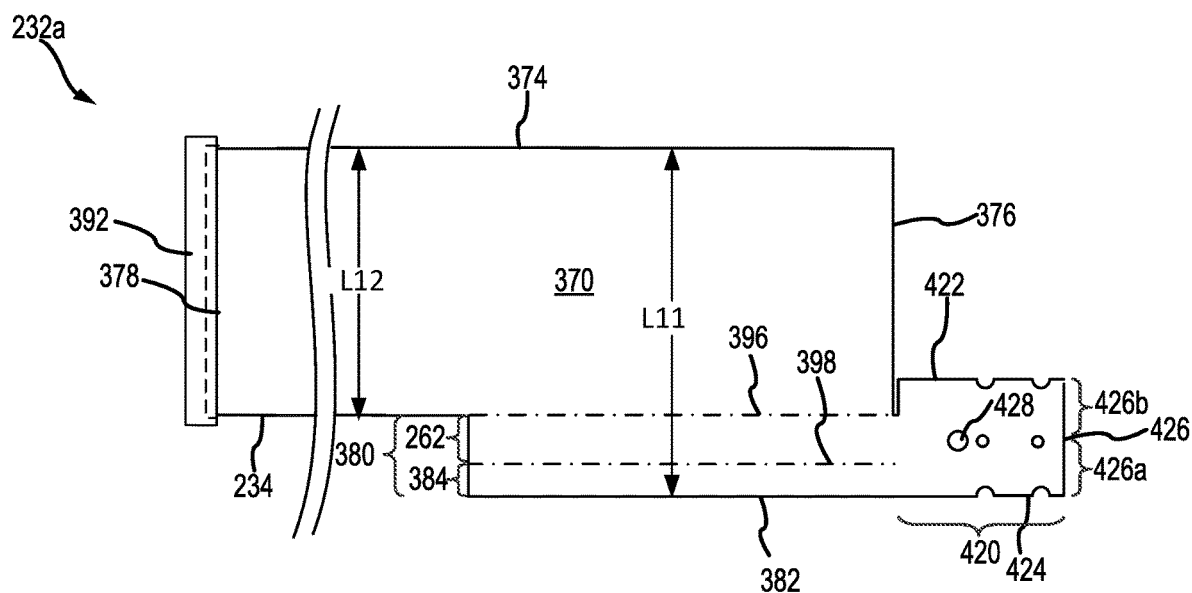
FIG. 6B illustrates a panel configured to form the inflatable tube of FIG. 5A, in accordance with various embodiments.

FIG. 6A shows toe end 234 of third inflatable tube 232a prior to attachment to fourth inflatable tube 232b. FIG. 6B illustrates third inflatable tube 232a prior to assembly of third inflatable tube 232a (i.e., FIG. 6B illustrates the fabric panel from which third inflatable tube 232a is formed).

With combined reference to FIGS. 6A and 6B, in accordance with various embodiments, third inflatable tube 232a includes an interior (or radially inward facing) surface 370 and an exterior (or radially outward facing) surface 372. Interior and exterior surfaces 370, 372 extend from toe end 234 of third inflatable tube 232a to a head end 374 of third inflatable tube 232a and from a first longitudinal end 376 of third inflatable tube 232a to a second longitudinal end 378 of third inflatable tube 232a. A seam tape 392 bonds first longitudinal end 376 to second longitudinal end 378. Seam tape 392 is configured to form an airtight seal with interior surface 370.

In accordance with various embodiments, third inflatable tube 232a includes a cable channel portion 380. Cable channel portion 380 extends from toe end 234. Cable channel portion 380 is configured to form integral cable channel 246 in FIG. 4B. In various embodiments, a longitudinal length L11 of interior surface 370, as measured between head end 374 and a distal end 382 of cable channel portion 380, is greater than a longitudinal length L12 of interior surface 370, as measured between head end 374 and toe end 234.

With combined reference to FIG. 4A, FIG. 6A, and FIG. 6B, cable channel portion 380 includes an attachment portion 384 located proximate distal end 382 of cable channel portion 380. Interior surface 370 of attachment portion 384 is configured to attach to a land portion 386 on an exterior surface 390 of fourth inflatable tube 232b. Land portion 386 is located proximate to head end 236 of fourth inflatable tube 232b. In various embodiments, an adhesive 394 may bond attachment portion 384 to land portion 386.

In various embodiments, cable channel portion 380 defines lower cable channel 262. The longitudinal length of attachment portion 884 is less than the longitudinal length of cable channel portion 380, thereby creating lower cable channel 262. Cable channel 262 comprises an area of cable channel portion 380 that is not affixed to exterior surface 390 of fourth inflatable tube 232b or seam tape 226. Lower cable channel 262 extends from a seal tape attachment point 396 located along toe end 234 to an adhesive attachment point 398 formed along attachment portion 384. Seal tape 226 is affixed to interior surface 370 along seal tape attachment point 396. Adhesive 394 is affixed to interior surface along adhesive attachment point 398.

In accordance with various embodiments, a pouch portion 420 may extend from first longitudinal end 376. Pouch portion 420 is configured to form pouch 248 in FIG. 3B. A first end 422 of pouch portion 420 may be attached via, for example, adhesive or sewing, to a second end 424 of pouch portion 420. Second end 424 may be coplanar with distal end 382 of cable channel portion 380. A first portion 426a of a distal surface 426 of pouch portion 420 may be attached via, for example, adhesive or sewing, to a second portion 426b of distal surface 426. Pouch portion 420 may define one or more apertures 428 configured to allow water to flow into battery pouch 248 and contact water-activated battery 252 (FIG. 3B).

Cable channel portion 380 and pouch portion 420 are integral to third inflatable tube 232a. In this regard, third inflatable tube 232a including cable channel portion 380 and pouch portion 420 may be formed from a single panel or single piece of fabric. Integrating the cable channel and pouch by utilizing the fabric of third inflatable tube 232a tends to reduce cost and time associated with manufacturing inflatable slide 210.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable tube for an inflatable slide, comprising:
    an interior surface extending from a first longitudinal end of the inflatable tube to a second longitudinal end of the inflatable tube opposite the first longitudinal end;
    an exterior surface opposite the interior surface, the exterior surface including a land portion located proximate the first longitudinal end;
    a channel portion extending from the second longitudinal end, the channel portion including an attachment portion located proximate a distal longitudinal end of the channel portion, wherein the interior surface of the attachment portion is attached to the land portion of the exterior surface;
    a seam tape bonded to the interior surface at the first longitudinal end and the second longitudinal end, wherein the channel portion defines a cable channel located along the seam tape and extending parallel to the first longitudinal end, the second longitudinal end, and the seam tape;
    a cable through the cable channel; and
    a readiness indicator sign attached to a first end of the cable, wherein a second end of the cable is attached to a toe end of the inflatable tube, wherein a length of the cable is configured to translate the readiness indicator sign into the cable channel in response to the toe end of the inflatable tube translating to a fully deployed position.

2. The inflatable tube of claim 1, further comprising an adhesive bonding the attachment portion to the land portion.

3. The inflatable tube of claim 2, wherein the cable channel extends from the second longitudinal end to a location where the adhesive bonds the attachment portion to the land portion.

4. The inflatable tube of claim 2, wherein a circumferential length of the channel portion extending from the second longitudinal end to the distal longitudinal end of the channel portion is between 2 inches and 4 inches.

5. An inflatable slide, comprising:
    a first inflatable tube including a first integral cable channel portion extending from at least one of a head end or a toe end of the first inflatable tube;
    a second inflatable tube coupled to the at least one of the head end or the toe end of the first inflatable tube, wherein a first attachment portion of the first integral cable channel portion is coupled to a first exterior surface of the second inflatable tube; and
    a seam tape bonded to a first interior surface of the first inflatable tube and a second interior surface of the second inflatable tube, the seam tape extending from the at least one of the head end or the toe end of the first inflatable tube to the second interior surface of the second inflatable tube, wherein the first integral cable channel portion defines an upper cable channel at a first joint formed by the seam tape between the first inflatable tube and the second inflatable tube, and wherein the upper cable channel extends along the first joint in a circumferential direction.

6. The inflatable slide of claim 5, further comprising:
    a third inflatable tube including a second integral cable channel portion extending from at least one of a head end or a toe end of the third inflatable tube, the first inflatable tube being located on the third inflatable tube; and
    a fourth inflatable tube coupled to the at least one of the head end or the toe end of the third inflatable tube, wherein a second attachment portion of the second integral cable channel portion is coupled to a second exterior surface of the fourth inflatable tube, and wherein the second integral cable channel portion defines a lower cable channel extending in the circumferential direction at a second joint between the third inflatable tube and the fourth inflatable tube.

7. The inflatable slide of claim 6, wherein the second integral cable channel portion includes a pouch extending away from the first inflatable tube and the second inflatable tube.

8. The inflatable slide of claim 7, further comprising:
    a light coupled to at least one of the first inflatable tube of the second inflatable tube;
    a water-activated battery located in the pouch; and
    a cable electrically connecting the light and the water-activated battery.

9. The inflatable slide of claim 8, wherein the cable is located in the upper cable channel defined by the first integral cable channel portion and the lower cable channel defined by the second integral cable channel portion.

10. A method of assembling an inflatable structure, the method comprising:
   attaching a first seam tape to a first internal surface of a first inflatable tube at a toe end of the first inflatable tube;
   coupling a second inflatable tube to the first inflatable tube by attaching the first seam tape to a second internal surface of the second inflatable tube at a head end of the second inflatable tube; and
   coupling a first attachment portion of a first cable channel portion of the first inflatable tube to a first exterior surface of the second inflatable tube, wherein the first cable channel portion extends from the toe end of the first inflatable tube, and wherein the first cable channel portion defines a first cable channel at a first joint formed by the first seam tape between the toe end of the first inflatable tube and the head end of the second inflatable tube, and wherein the first cable channel extends along the first joint in a circumferential direction.

11. The method of claim 10, further comprising:
   locating the first inflatable tube on a third inflatable tube;
   attaching a second seam tape to a third internal surface of the third inflatable tube at a toe end of the third inflatable tube;
   coupling a fourth inflatable tube to the third inflatable tube by attaching the second seam tape to a fourth internal surface of the fourth inflatable tube at a head end of the fourth inflatable tube; and
   coupling a second attachment portion of a second cable channel portion of the third inflatable tube to a second exterior surface of the fourth inflatable tube, wherein the second cable channel portion extends from the toe end of the third inflatable tube, and wherein the second cable channel portion defines a second cable channel extending in the circumferential direction at a second joint formed by the second seam tape between the toe end of the third inflatable tube and the head end of the fourth inflatable tube.

12. The method of claim 11, wherein the second cable channel portion includes a pouch portion extending away from the first inflatable tube and the second inflatable tube.

13. The method of claim 12, further comprising:
   coupling a light to at least one of the first inflatable tube or the second inflatable tube;
   locating a water-activated battery in the pouch portion; and
   locating a cable electrically coupled to the light and the water-activated battery through the first cable channel and the second cable channel.

14. The method of claim 13, further comprising forming an aperture in the pouch portion of the second cable channel portion.

15. The method of claim 10, further comprising bonding the first attachment portion of the first cable channel portion to a land portion of the first exterior surface of the second inflatable tube using an adhesive.

* * * * *